Aug. 27, 1957  C. W. JOHNSON ET AL  2,803,947
HYDRAULIC MASTER CYLINDER ASSEMBLY
Filed May 3, 1955  2 Sheets-Sheet 2

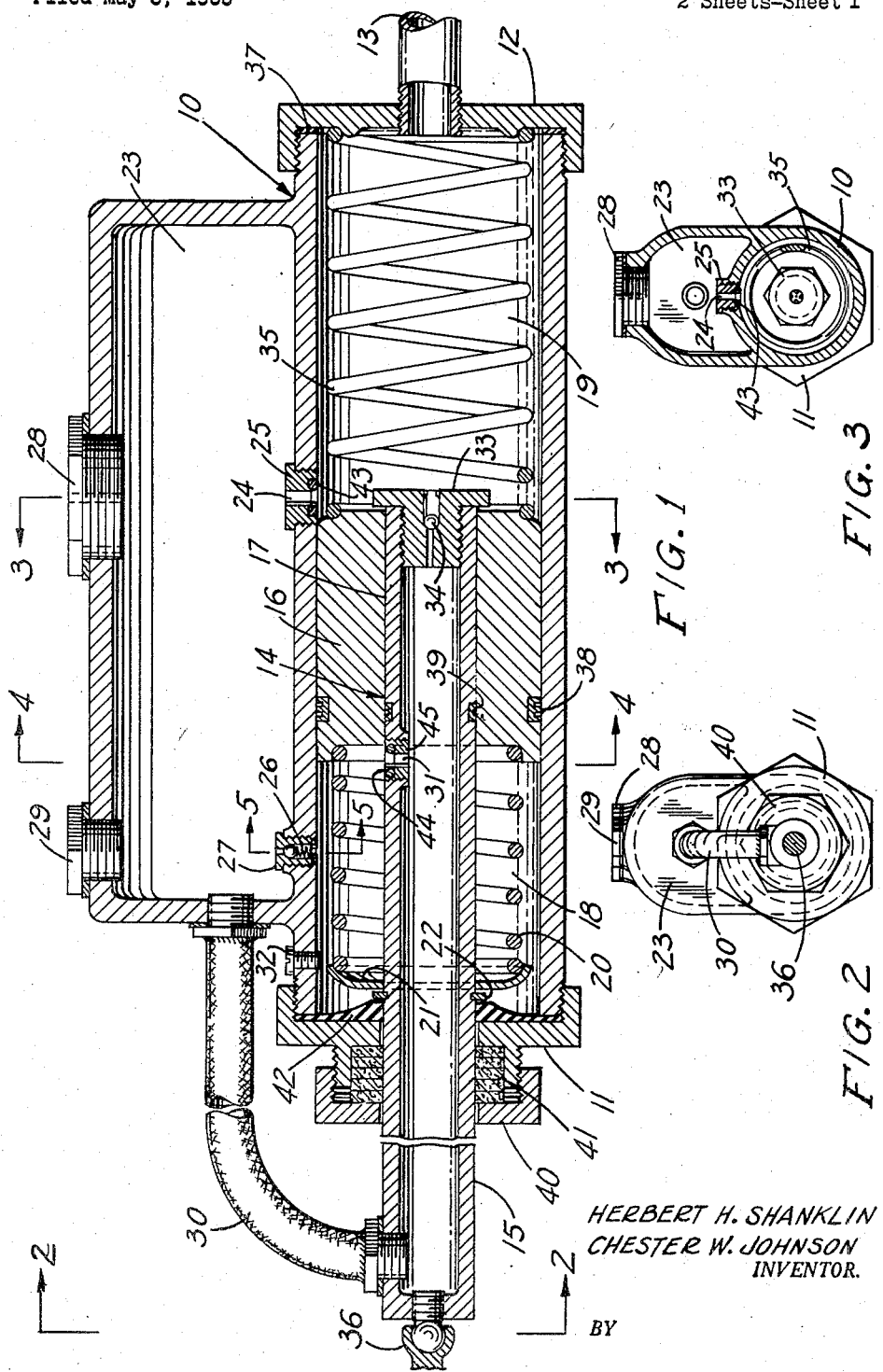

HERBERT H. SHANKLIN
CHESTER W. JOHNSON
INVENTOR.

BY

*McMorrow, Berman & Davidson*
ATTORNEYS

United States Patent Office 2,803,947
Patented Aug. 27, 1957

2,803,947

HYDRAULIC MASTER CYLINDER ASSEMBLY

Chester W. Johnson and Herbert H. Shanklin,
Butte, Mont.

Application May 3, 1955, Serial No. 505,606

3 Claims. (Cl. 60—54.6)

The present invention relates to a hydraulic master cylinder as used in a brake system and in particular to one having a compound high and low pressure piston.

The primary object of the present invention is to provide a hydraulic master cylinder assembly which applies high pressure to the brakes in a brake system without the need for hard pedal pressure.

Another object of the present invention is to provide a hydraulic master cylinder assembly having a low pressure piston and providing means for holding the low pressure piston against backing up movement in the pressure chamber when a high pressure piston increases the pressure therein.

A further object of the present invention is to provide a hydraulic master cylinder assembly of sturdy construction, simple in design and structure, one easily assembled and disassembled, and one which is economical to manufacture and distribute.

Figure 4:
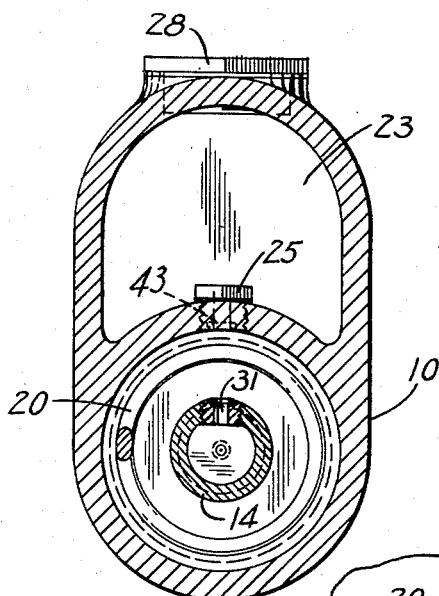
Figure 6:
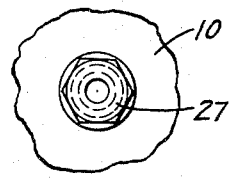
Figure 5:
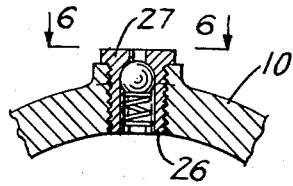
Figure 7:
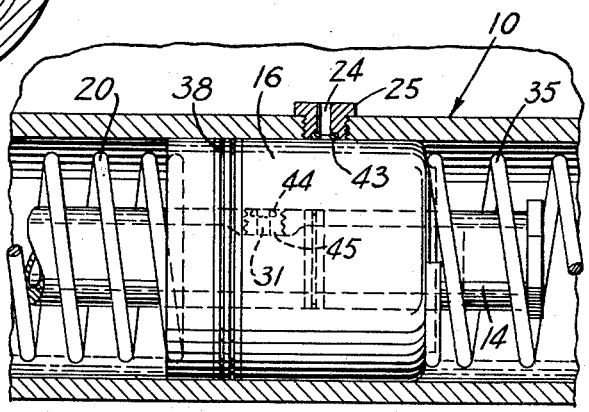
Figure 8:
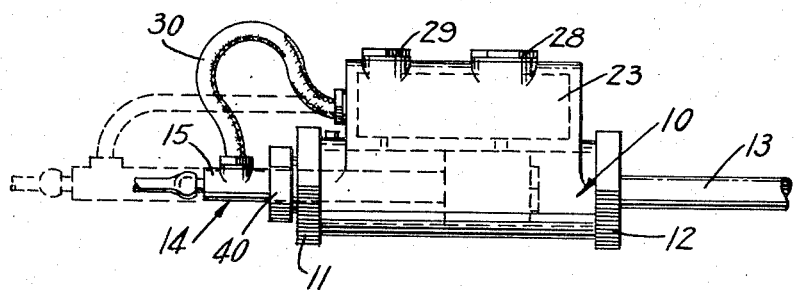

These and other objects and advantages of the present invention will be fully apparent from the following description when taken in connection with the annexed drawings, in which:

Figure 1 is a side elevational view in cross-section of the master cylinder assembly of the present invention, Figure 2 is an end view, greatly reduced, taken on line 2—2 of Figure 1, Figure 3 is an end view in cross-section, greatly reduced, taken on line 3—3 of Figure 1, Figure 4 is an end view in cross-section on line 4—4 of Figure 1, Figure 5 is a detailed view in cross-section on line 5—5 of Figure 1, Figure 6 is a vertical view as seen on line 6—6 of Figure 5, Figure 7 is a partial view in cross-section of the assembly shown in Figure 1 after pressure of the brake pedal has initiated movement of the piston and the actuating member of the present invention, and Figure 8 is a side view in elevation somewhat reduced, showing in dotted lines the movement of the actuating member with the attached portion of the brake pedal connection.

Referring in greater detail to the drawings in which like numerals indicate like parts throughout the several views, the present invention consists in a hydraulic master cylinder assembly comprising a cylinder 10 having one end closed by a cap 11 and the other end closed by a cap 12, the latter cap having an outlet 13 adapted to be connected to a hydraulic brake system.

A hollow actuating member 14 having both of its ends closed is mounted within the cylinder 10 for reciprocal movement toward and away from the outlet 13 and has one end portion 15 exteriorly of the other end of the cylinder opposite to the outlet 13.

An annular piston 16 is slidably mounted upon the other end portion 17 of the actuating member 14 and subdivides the space within the cylinder 10 into a fluid equalizing chamber indicated in Figure 1 by the reference numeral 18 and a pressure chamber indicated in that figure by the reference numeral 19. The pressure chamber 19 is at the one end of the cylinder 10 adjacent to the cap 12 and the outlet 13.

A coil spring 20 is disposed within the pressure chamber 18 and has one end bearing upon the adjacent face of the piston 16 and has the other end connected to the actuating member 14 by means of a spring coupling 21 and a snap ring 22 which fits within a groove formed in the outer side of the actuating member 14.

A reservoir 23 is provided on the top side of the cylinder 10 and has a passage 24 partially closed by a plug 25 connecting the reservoir with the pressure chamber 19.

Another passage 26 connects the reservoir with the equalizing chamber 18, there being a threaded plug 27 having a check valve therein threaded in the passage 26.

Filler caps 28 and 29 are provided in the upper end of the reservoir 23 and provide a means for installing the plugs 25 and 27, respectively.

A flexible conduit 30 connects the one end portion 15 of the actuating member 14 with the reservoir 23 so that fluid will flow from the reservoir 23 into the interior of the actuating member 14 and through a port 31 in one side of the actuating member 14 into the equalizing chamber 18 upon movement of the piston toward the outlet. A bleed hole is provided in the end of the cylinder adjacent the cap 11 and is closable by a threaded plug 32, and provides a means for bleeding off any air which might be entrapped within the equalizing chamber 18.

The end of the actuating member 14 which is adjacent and projects into the pressure chamber 19 is provided with a threaded plug 33 having its end overlying the end of the actuating member 14 and providing a stop for the piston 16 so that upon retractive movement of the actuating member 14 from the pressure chamber 19 it will move the piston 16 along with it.

The threaded plug 33 is provided with a check valve 34 which prevents the flow of fluid from the pressure chamber 19 to the interior of the actuating member 14. A second coil spring 35 within the pressure chamber 19 serves to return the piston to its initial position upon retractive movement of the actuating member 14 from the pressure chamber 19. The end portion 15 of the actuating member 14 which projects from the cap 11 is provided with a ball joint connection to the brake pedal of the brake system, the connection being indicated in Figure 1 by the reference numeral 36.

A packing ring 37 underlies the cap 12 and seals that one end of the cylinder 10 and packing rings 38 and 39 on the piston 16 and actuating member 14, respectively, serve to seal the pressure chamber 19 from the equalizing chamber 18, there being provided for the cap 11 a packing nut 40 for enclosing and tightening the packing 41 around the actuating member 14. A resilient gland member 42 closes the end of the cylinder 10 adjacent to the cap 11 and serves to further maintain the pressure of the fluid in the equalizing chamber 18.

In use, whenever the brake pedal (not shown) of the brake system applies pressure through its connection 36 to the end of the actuating member 14, the actuating member 14 will move inwardly of the cylinder 10 until the pressure of the fluid within the brake cylinders on each wheel of the vehicle to which the system is applied and the pressure in the pressure chamber 19 equals the pressure exerted by the spring 20 upon the one end of the piston facing the equalizing chamber 18. At this point, the piston will have moved in response to the pressure of the spring 20 and the movement of the actuating member 14 into the pressure chamber 19 closing the passage 24. Further movement of the actuating member 14 inwardly of the cylinder 10 will close the port 31 by moving the actuating member relative to the piston 16. The fluid then within the equalizing chamber 18 will prevent backward movement of the piston 16 upon further increase of the pressure in the pressure chamber 19 caused by the movement of the actuating member thereinto. When pressure on the actuating member 14 is released, it will move back to its initial position with respect to the piston 16, opening the port 31 so that the fluid within the equalizing chamber 18 will flow backward through the interior of the actuating member 14 to the reservoir 23.

The end of the plug 25 projecting into the pressure chamber is provided with an O-ring seal 43 fitting into a groove provided in the plug and projecting into the pressure chamber far enough so that when the piston 16 is moved into the pressure chamber the passage 24 is positively closed. A similar seal 44 is provided in the outer end of a plug 45 threadedly secured in the port 31 and is similarly engaged by the piston 16 when the actuating member is moved into the piston positively closing the port 31. While O-rings are shown and described, other types of seals may be used if found more practical to manufacture and service.

Whenever the piston 16 has been moved into the pressure chamber 19 by the action of the actuating member 14 and its connection with a spring 20 and the port 31 has been closed by further movement of the actuating member relative to the piston 16, as shown in dotted lines in Figure 7, any further application of pressure on the brake pedal will cause the actuating member 14 to move into the pressure chamber 19, increasing the pressure therein. Should the pressure in the pressure chamber 19 be lost due to actuation of one of the brake cylinders in the system or for other reasons, and pressure is applied to the actuating member 14, the coil spring 20 will move the piston 16 further into the pressure chamber 19 and the passage 26 will permit further flow of fluid from the reservoir into the equalizing chamber 18 to make up for this movement of the piston 16.

Further, should the brake cylinders in the system be stiff due to frost or rust, or mechanical damage, so that the spring 20 fails to move the piston 16 as above described beyond the point where the piston has closed the passage 24, short pumping strokes of the actuating member will pump fluid through the check valve 34 in the end of the actuating member to increase the pressure in the pressure chamber.

It will be seen, therefore, that the arrangement of the pressure chamber with the piston and the actuating member 14 and the structure of the actuating member 14 and the associated equalizing chamber 18 provides a hydraulic master cylinder assembly having in effect a low pressure piston and a high pressure piston so that high pressure may be applied to the brakes in a brake system with relatively less movement of the brake pedal.

What is claimed is:

1. A hydraulic master cylinder comprising a cylinder having both ends closed and provided with an outlet in one of said ends, a hollow actuating member having closed ends mounted within said cylinder for reciprocal movement toward and away from said outlet and having one end portion exteriorly of the other end of said cylinder, an annular piston slidably carried by the other end portion of said actuating member subdividing the space within said cylinder into a fluid equalizing chamber and a fluid pressure chamber, said pressure chamber being adjacent the one end of said cylinder having said outlet, resilient means disposed in said equalizing chamber and operatively connected to said piston and to the adjacent part of said actuating member for biasing said piston toward said pressure chamber, a reservoir, a flexible conduit connecting said one end portion of said actuating member with said reservoir, a port in the side of said actuating member adjacent the end of said piston facing said equalizing chamber, the other end of said other end portion of said actuating member having a check valve for preventing the flow of fluid from the pressure chamber to the interior of said actuating member, said piston being operable to close said port upon initiation of movement of said actuating member toward said outlet and into said pressure chamber after the pressure of fluid in said pressure chamber equals the pressure exerted by said resilient means on said piston whereby fluid in said equalizing chamber is locked and prevents movement of said piston outwardly from said pressure chamber, and a spring in said pressure chamber for moving said piston outwardly therefrom upon retraction of said actuating member from said pressure chamber.

2. A hydraulic master cylinder assembly comprising a cylinder having both ends closed and provided with an outlet in one of said ends, a hollow actuating member having closed ends mounted within said cylinder for reciprocal movement toward and away from said outlet and having one end portion exteriorly of the other end of said cylinder, an annular piston slidably carried by the other end portion of said actuating member subdividing the space within said cylinder into a fluid equalizing chamber and a fluid pressure chamber, said pressure chamber being adjacent the one end of said cylinder having said outlet, resilient means disposed within said equalizing chamber and operatively connected to said piston and to the adjacent part of said actuating member for biasing said piston toward said pressure chamber, a reservoir having a passage connecting said reservoir with said pressure chamber, a flexible conduit connecting said one end portion of said actuating member with said reservoir, a port in the side of said actuating member adjacent to the end of said piston facing the equalizing chamber, the other end of said other end portion of said actuating member having a check valve for preventing the flow of fluid from the pressure chamber to the interior of said actuating member, said piston being operable to close said passage upon initiation of movement of said actuation member toward said outlet and to close said port upon initiation of further movement of said actuating member toward said outlet and into said pressure chamber after the pressure of fluid in said pressure chamber equals the pressure exerted by said resilient means on said piston whereby fluid in said equalizing chamber is locked and prevents movement of said piston outwardly from said pressure chamber, said reservoir being provided with a check-valved passage connecting said reservoir with said equalizing chamber and preventing fluid flow from said equalizing chamber into said reservoir, and a spring in said pressure chamber for moving said piston outwardly therefrom upon retraction of said actuating member from said pressure chamber.

3. A hydraulic master cylinder assembly comprising a cylinder having both ends closed and provided with an outlet in one of said ends, a hollow actuating member having closed ends mounted within said cylinder for reciprocal movement toward and away from said outlet and having one end portion exteriorly of the other end of said cylinder, an annular piston slidably carried by the other end portion of the actuating member subdividing the space within said cylinder into a fluid equalizing chamber and a fluid pressure chamber, said pressure chamber being adjacent the one end of said cylinder having said outlet, resilient means disposed within said equalizing chamber and operatively connected to said piston and to the adjacent part of said actuating member for biasing said piston toward said pressure chamber, a reservoir having a passage connecting said reservoir with said pressure chamber, a flexible conduit connecting said one end portion of said actuating member with said reservoir, a port in the side of said actuating member adjacent the end of said piston facing said equalizing chamber, said piston being operable to close said passage upon initiation of movement of said actuating member toward said outlet and to close said port upon initiation of further movement of said actuating member toward said outlet and into said pressure chamber after the pressure of fluid in said pressure chamber equals the pressure exerted by said resilient means on said piston whereby fluid in said equalizing chamber is locked and prevents movement of said piston outwardly from said pressure chamber, said reservoir being provided with a check valved passage connecting said reservoir with said equalizing chamber and preventing fluid flow from said equalizing chamber into said reservoir, said actuating member being provided with a check-valved passage in the end of said actuating member adjacent said pressure chamber preventing fluid flow from said pressure chamber into said actuating member, and a spring in said pressure chamber for moving said piston outwardly therefrom upon retraction of said actuating member from said pressure chamber.

References Cited in the file of this patent
UNITED STATES PATENTS

| | | |
|---|---|---|
| 1,604,545 | Bragg et al. | Oct. 26, 1926 |
| 2,317,473 | Miller | Apr. 27, 1943 |
| 2,358,021 | Miller | Sept. 12, 1944 |
| 2,415,245 | Hopmans | Feb. 4, 1947 |